(No Model.)

A. MACKEY.
Connection to Meters.

No. 237,564. Patented Feb. 8, 1881.

WITNESSES
Charles C. Stetson
Edw. D. Stafford

INVENTOR
Alexander Mackey,
by his attorney
Thomas D. Stetson.

UNITED STATES PATENT OFFICE.

ALEXANDER MACKEY, OF NEW YORK, N. Y.

CONNECTION TO METERS.

SPECIFICATION forming part of Letters Patent No. 237,564, dated February 8, 1881.

Application filed October 13, 1880. (No model.)

*To all whom it may concern:*

Be it known that I, ALEXANDER MACKEY, a citizen of the United States, residing in the city of New York, in the State of New York, have invented certain new and useful Improvements relating to Connections to Meters, of which the following is a specification.

The invention is designed to apply to gas-meters, water-meters, and analogous meters generally. I will describe it as applied to a gas-meter.

The object is to better guard against the ordinary fraud perpetrated by consumers in disconnecting the service-pipe from the meter and making temporary connections to carry the fluid past the meter and using it in the house, manufactory, or other place to be supplied for a considerable time between the monthly inspections, thereby obtaining a large quantity of gas or other fluid which is not measured by the meter, and for which the consumer does not pay.

I can work out the invention in two or more forms, each of which will realize some of the advantages thereof. One allows of the invention being applied to old work.

The accompanying drawings form a part of this specification.

Figure 1:
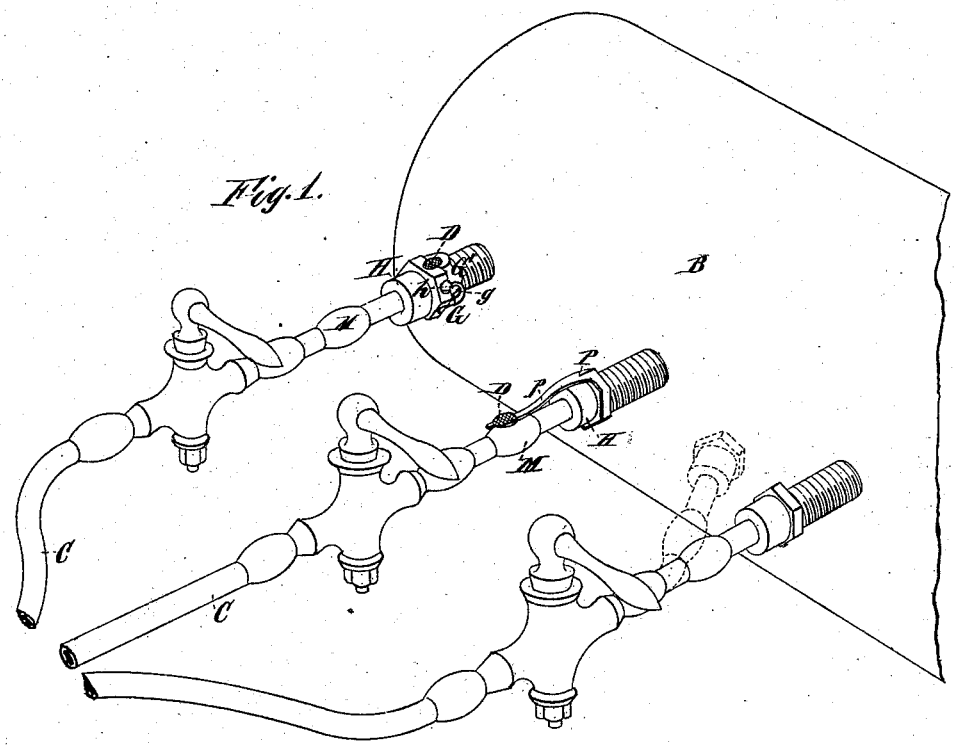
Figure 2:
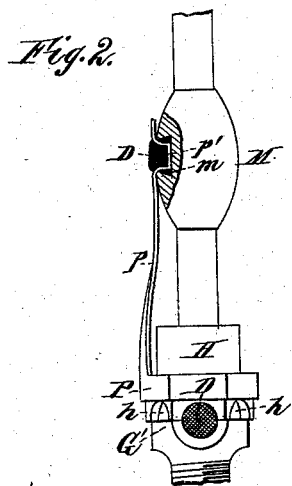
Figure 4:
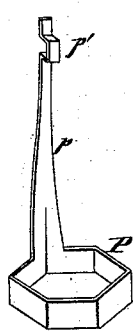

Figure 1 is a perspective view, showing a portion of a meter with three separate connections. It should be distinctly understood that I do not propose to attach three to the same meter. They are illustrations of separate connections, either of which can be employed. One—the one nearest the eye— does not contain the invention. I introduce it as an illustration. The dotted lines show the condition when the fraud is perpetrated which it is the object of my invention to prevent. The union has been disconnected and the service-pipe bent sufficiently out of the proper line to allow a temporary connection (not represented) to formed therewith, which leads over or past the meter and connects with the house-pipes, the gas thus flowing to the house being utilized without being registered by the meter. The other two connections in this Fig. 1 show my invention applied to some extent so as to prevent such fraud. Fig. 2 is an elevation, and Fig. 3 a sectional view, showing the fullest form of my improvement. In this the two means of guarding against fraud shown in the two distant connections in Fig. 1 are combined. A meter as ordinarily connected with screw-coupling connections or union-joints is but small protection against fraud, because of the readiness with which the pipes may be disconnected from it and a temporary pipe be led past it, connecting the service with the house pipe. Fig. 4 is a perspective view of the locking-piece.

Similar letters of reference indicate corresponding parts in all the figures.

B is a portion of the meter, being the side of the meter in which the gas is received. It will be understood that the meter may be of any ordinary or suitable construction.

C is the service-pipe conveying the gas from a street-main.

H is a union, constructed in any ordinary or suitable manner to connect or disconnect the parts by being turned by any suitable wrench.

P is a locking-piece having a hexagonal or suitably-formed yoke adapted to match on the hexagonal or other suitably-formed periphery of the union H, and thereby to gripe and hold the union H against being turned. The locking-piece P is provided with an arm, $p$, extending out parallel or nearly parallel to the axis of the pipe C. At or near its outer end is an offset, $p'$, which extends a little distance toward the axis of the pipe C.

M is a joint, formed with soldering in the manner known as a "wiped joint." There may be as many more such joints as the number of pieces or material or other conditions may require. My invention involves only the one nearest the screw-union.

I form a dovetailed recess, $m$, on the upper or other convenient side of the wiped joint M, and so proportion the parts that when the union H is secured and the joint is tightly made thereby and the locking-piece applied so that its yoke P will embrace the hexagonal part of the union H the arm $p$ will extend therefrom to the wiped joint, and the offset $p'$ will stand right to enter the recess $m$. When the parts are thus in place a proper quantity of melted sealing-wax, D, is applied to fill the recesses $m$, and something over, and upon this is imprinted the seal of the inspector.

The invention, so far as yet described, is shown in the middle connection in Fig. 1. This may be applied to old work.

In fitting up new work, or wherever the expense will be warranted, I employ, instead of the plain screw-union shown in the middle connection in Fig. 1, the specially-formed union G. (Shown in the farthest connection in Fig. 1 and in the additional Figs. 2 and 3.) This has a head or enlargement, G', formed, as shown, of about equal diameter with the hexagonal screw-cap H of the union. At several points in the periphery of the enlargement G' and of the union H, I form recesses g h in the enlargement G' and in the union H. These are distributed at unequal distances, there being two more partial recesses in the union H than in the enlargement G'. It follows that in turning the screw-union H to complete a joint it is certain to come to rest with the recess at some point coinciding, or very nearly coinciding, with one of the recesses in the head G'. I apply in those recesses where they correspond a proper quantity of melted sealing-wax, and apply the seal of the inspector.

By having two more recesses in the union H than in the enlargement G', I am certain to have the recesses match together at two points in the periphery. I can secure the devices effectually by sealing only one. The arrangement to insure two avoids the inconvenience of ever having to effect the sealing on the under side.

Figure 3:
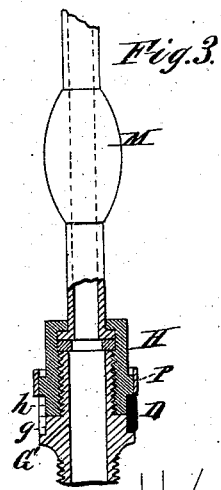

Either of the modes of fastening now described—to wit, the entering of the offset p' into the recess m in the wiped joint, and securing it with wax D and with a seal, or the matching of two recesses in the parts G' and H and the securing with wax D and with the impression of the seal—will realize a portion of the advantages of my invention; but in the fullest form I apply both. Figs. 2 and 3 show this arrangement. The locking-yoke P is engaged on the properly-formed periphery of the union H, and the offset p' from its arm p is entered in the recess m in the wiped joint M and secured with wax D, with the impression of the seal, and in combination therewith I find the point on the upper side of the joint where the recesses in the parts G' and H coincide, and there apply the melted wax D, and impress on it also the seal of the inspector. In order to violate this joint, both seals must be broken, and an additional security is thereby attained. In order to effect this combination, it is important to provide means for insuring a tightness of the union with the union H, having one of its angles in line with the recess m in the wiped joint, whether that position brings the coupling quite together—metal and metal—or not. To make a tight joint under these conditions, I employ a considerable washer, J, of leather or other yielding material, in the position represented. (Shown in Fig. 3.) This makes a tight joint, with the union H screwed down a little more or a little less. With this provision I can turn the union H until it begins to bear gently on the soft washer J, and then, applying the locking-piece, observe whether the offset p' matches the hole m. If it does not, I shift the locking-piece around to a new position, so that its arm p corresponds with another angle of the union H, and turn the latter farther until its offset p' coincides with the recess, and then seal at the two points.

Modifications may be made in the details. I can make the enlargement G' round instead of square or quarterfoil, as shown. I can provide a greater or less number of sides in the union H, or can make it star-shaped, or with teeth of greater or less fineness, always providing that the coupling-yoke P be adapted to be reliably engaged therewith.

Instead of the offset p', the arm p may be formed with a branch which will extend into the recess m and perform the same function.

I claim as my invention—

1. The meter B, nozzle G, union H, and locking-piece P p, having an offset or branch, p', in combination with the wiped joint M, having a recess, m, and wax D, adapted to prevent the disconnection of the service-pipe C from the meter, as and for the purposes herein specified.

2. The enlargement G' and union H, having partial recesses g h, and wax D, in combination with the locking-piece P, having an arm, p, and offset or branch p', and the wiped joint M, having a recess, m, and wax D, and with the meter B and service-pipe C, all substantially as and for the purposes herein specified.

In testimony whereof I have hereunto set my hand, at New York city, this 12th day of October, 1880, in the presence of two subscribing witnesses.

ALEXR. MACKEY.

Witnesses:
M. WINTJEN,
J. E. MUNDY.